United States Patent [19]
Althausen

[11] Patent Number: 6,033,104
[45] Date of Patent: Mar. 7, 2000

[54] DEVICE FOR REMOVING PLASTICS RESIDUES FROM MIXER HEAD OUTLET PIPES

[75] Inventor: Ferdinand Althausen, Neunkirchen, Germany

[73] Assignee: Hennecke GmbH, Leverkusen, Germany

[21] Appl. No.: 09/060,714

[22] Filed: Apr. 15, 1998

[30] Foreign Application Priority Data

Apr. 23, 1997 [DE] Germany ............................ 197 16 982

[51] Int. Cl.⁷ .................................................. B01F 15/00
[52] U.S. Cl. ...................................... 366/162.5; 422/133
[58] Field of Search ............................ 366/159.1, 162.4, 366/162.5, 167.1, 173.1; 422/133–135

[56] References Cited

U.S. PATENT DOCUMENTS

| | | | |
|---|---|---|---|
| 4,442,070 | 4/1984 | Proksa et al. | 366/162.5 |
| 4,515,091 | 5/1985 | Schlueter . | |
| 4,721,602 | 1/1988 | Woitzel | 422/133 |
| 5,057,548 | 10/1991 | Urban et al. . | |
| 5,785,422 | 7/1998 | Eidenmuller | 366/162.5 |

FOREIGN PATENT DOCUMENTS

| | | |
|---|---|---|
| 8616880 | 1/1987 | Germany . |
| 3907015 | 9/1990 | Germany . |
| 4340559 | 6/1995 | Germany . |
| 4411901 | 10/1995 | Germany . |

*Primary Examiner*—Charles E. Cooley
*Attorney, Agent, or Firm*—Joseph C. Gil; Noland J. Cheung

[57] ABSTRACT

A device for removing plastics residue from a cleaning piston having an end face and a mixer head outlet pipe of a counter-current injection mixer head, wherein the device comprises a stripping plunger having a stripping edge; a mortar for receiving the stripping plunger, the mortar comprising an outlet opening for disposing the plastics residue from the mortar which is disposed at an angle to an impact face of the mortar; a hydraulic device for bringing the mixer head and the stripping plunger towards each other in the cleaning position, in which the stripping edge of the stripping plunger is aligned with the end face of the cleaning piston, wherein the axis of the cleaning piston is situated between the mortar and the stripping plunger; and a hydraulic device for moving the stripping plunger parallel to the end face of the cleaning piston into the mortar and towards the impact face of the mortar.

12 Claims, 3 Drawing Sheets

Fig. 3
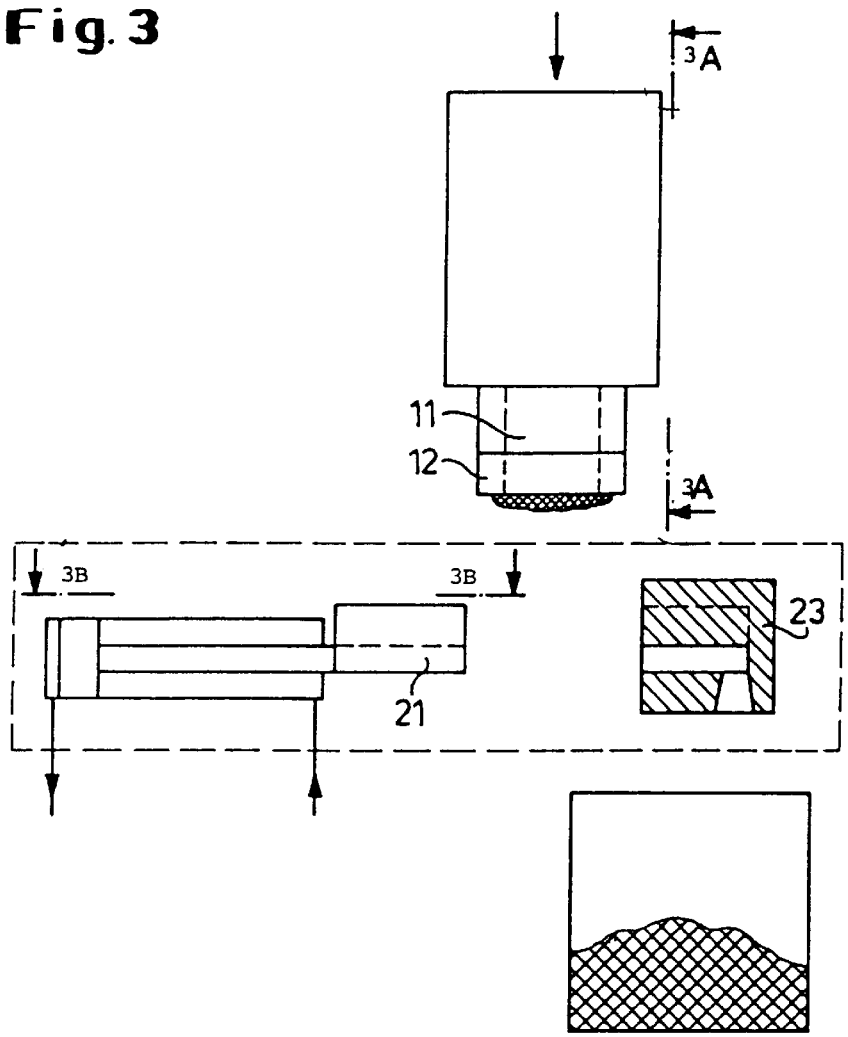
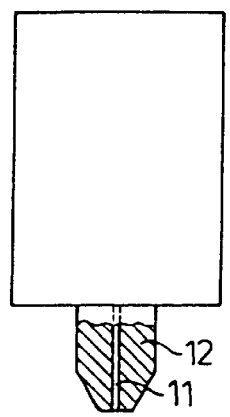
Fig. 3A
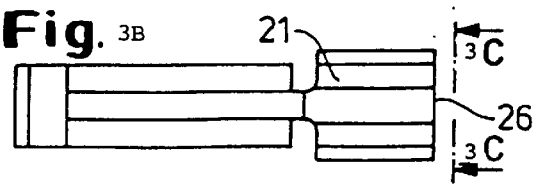
Fig. 3B
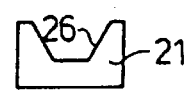
Fig. 3C

DEVICE FOR REMOVING PLASTICS RESIDUES FROM MIXER HEAD OUTLET PIPES

FIELD OF THE INVENTION

The present invention relates to a device for removing plastics residues, particularly polyurethane residues, from the cleaning piston and outlet pipe of a mixer head, particularly a counter-current injection mixer head for the production of reactive polyurethane mixtures.

BACKGROUND OF THE INVENTION

The underlying object of the present invention has already been discussed in EP-A-0,101,988. According to this document, the outlet pipe and the cleaning piston are heated after each filling of a mold (injection operation), so that the plastics residue which remains adhered to the outlet pipe and to the cleaning piston after filling of the mold is volatilized. However, due to the inertia of heating, the solution which is proposed in EP-A-0,101,988 cannot be used for a rapid operating cycle, i.e. when there is a rapid sequence of injection operations, or can only be used at high cost. For example, during the substantially automated mold filling operations which are presently employed, plastics molds are filled using cycle times of 10 to 30 seconds. The problem also arises of reliably capturing and disposing of the gases produced during the volatilization of the plastics residues.

It has been proposed according to U.S. Pat. No. 4,340,559 that residues which adhere to the side of the outlet pipe are first pushed by means of a stripping ring into the outlet plane of the outlet pipe and that such residues are subsequently removed from the outlet pipe and the cleaning piston by means of a cleaning belt which travels over rollers. The removal of residues as discussed by U.S. Pat. No. 4,340,559 results in problems if substantial hardening of the reactive polyurethane mixture has already occurred before the residue is removed.

SUMMARY OF THE INVENTION

The present invention relates to a device for removing plastics residue from a cleaning piston having an end face and a mixer head outlet pipe of a counter-current injection mixer head, wherein said device comprises a stripping plunger having a stripping edge; a mortar for receiving said stripping plunger, said mortar comprising an outlet opening for disposing said plastics residue from said mortar which is disposed at an angle to an impact face of said mortar; a hydraulic means for bringing said mixer head and said stripping plunger towards each other in the cleaning position, in which said stripping edge of said stripping plunger is aligned with said end face of said cleaning piston, wherein the axis of said cleaning piston is situated between said mortar and said stripping plunger; and a hydraulic means for moving said stripping plunger parallel to said end face of said cleaning piston into said mortar and towards said impact face of said mortar.

BRIEF DESCRIPTION OF THE DRAWINGS

FIG. 3 shows the cleaning device according to the present invention for a slit-shaped outlet pipe with a correspondingly shaped cleaning piston.

FIG. 3A shows the view taken along line 3A—3A of FIG. 3 of the cleaning plunger being matched to the contour of the outlet pipe as shown in FIG. 3.

FIG. 3B shows the view of the end face of the cleaning plunger taken along line 3B—3B of FIG. 3.

FIG. 3C shows the view taken along line 3C—3C of FIG. 3B.

DESCRIPTION OF THE INVENTION

Even firmly adhering plastics residues, and, if necessary, those which have already hardened, can reliably be removed from the end face of the cleaning piston and from the mixer head outlet pipe by means of the stripping plunger. The plastics residues, which are subsequently conveyed by the stripping plunger into a mortar which is matched to the cross-sectional shape of the plunger, are rammed against the impact face of the mortar there and are thereby comminuted. The comminuted plastics residues fall through an outlet opening which is provided in the mortar and which is aligned with the impact face thereof, into a catchment and collection vessel, wherein such residues can subsequently be recycled. The stripping plunger is preferably moved and pushed into the mortar by means of a hydraulic system, wherein the hydraulic fluid may be at a pressure of 150 to 180 bar. By correspondingly fashioning the cross-section of the stripping plunger and of the hydraulic piston, a force per unit area of 10 to 500 N/mm$^2$ can be exerted on the impact face of the mortar. This force is sufficient for the comminution of hardened polyurethane residues, even if they contain fillers. The force per unit area is preferably between 30 and 100 N/mm$^2$.

In addition, a stripping ring may be provided for the removal of residues adhering to the side of the outlet pipe. This stripping ring conveys residues adhering to the side into the plane of the outlet opening before they are stripped by means of the stripping plunger. The stripping ring can be attached to the mixer head as illustrated in U.S. Pat. No. 4,340,559, FIG. 6, or can be attached to the cleaning device, wherein in the latter case the stripping ring is of divisible construction and is closed after moving the mixer head into the cleaning position, so that it surrounds the outlet pipe.

Figure 1:
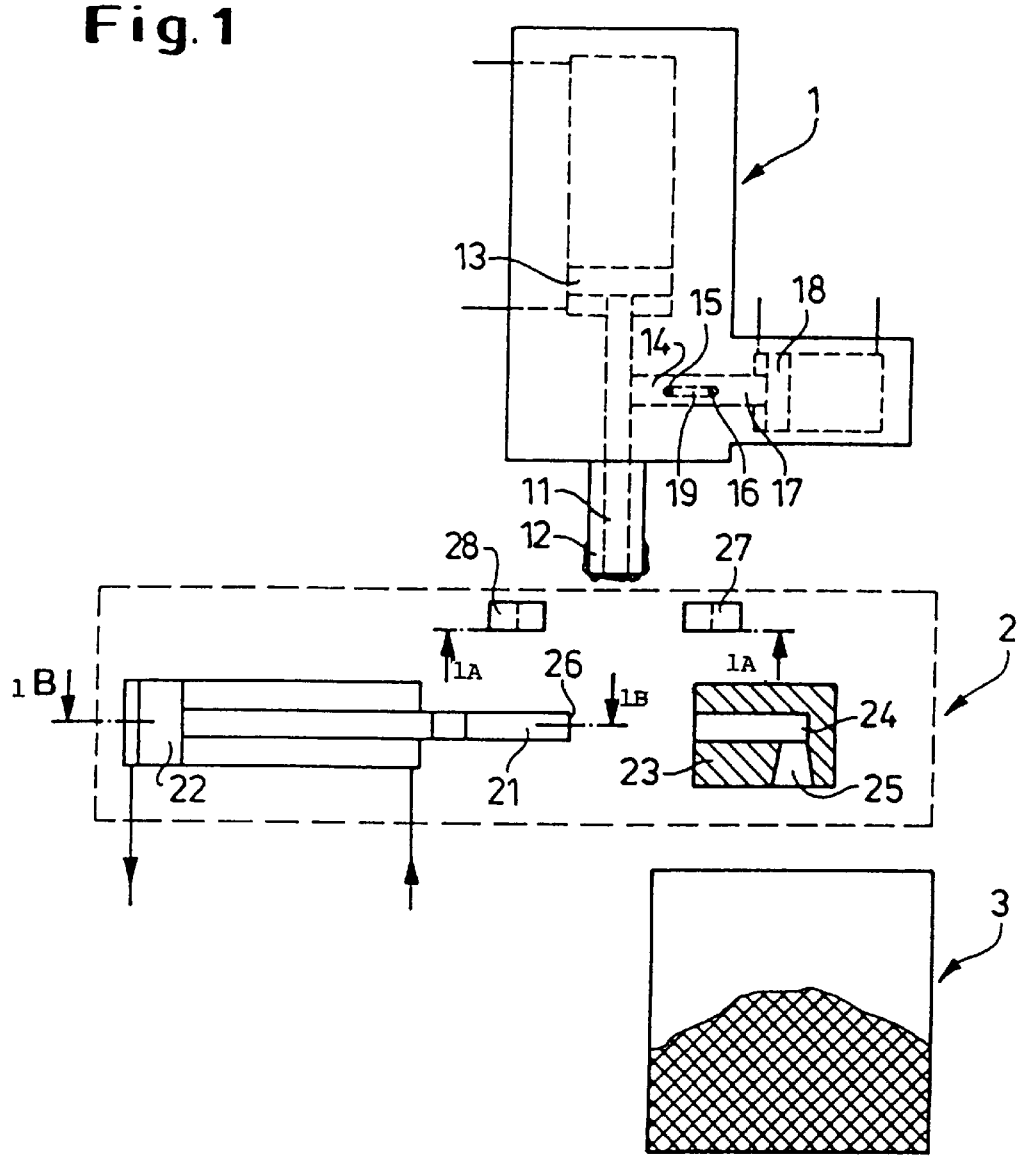
FIG. 1 shows the device according to the present invention in a form of a construction for a mixer head

FIG. 1 shows the device according to the present invention in a form of construction for a mixer head 1 comprising an outlet pipe 12 and a cleaning piston 11 having a substantially circular cross-section. After the completion of the injection operation, the cleaning piston 11 is brought by means of a hydraulic piston 13 into a position in which it closes the outlet pipe 12. The mixer head 1, which is known in the art, also comprises a mixing chamber 14, into which opposing injection nozzles 15 for the polyol and isocyanate main components of the reactive polyurethane mixture lead into. In the operating position which is illustrated, namely after the completion of the injection operation, the mixing chamber 14 is closed by the closure piston 17 by means of the hydraulic piston 18, so that the reactive components are connected to return lines 16 via slots 19. The cleaning device 2 consists of a stripping plunger 21 which can be moved perpendicularly to the axis of the cleaning piston 11 by means of a hydraulic piston 22, and of the mortar 23, which has an impact face 24 and an outlet opening 25. A catchment vessel 3 for the residues which are comminuted in the mortar 23 can be provided underneath the outlet opening 25.

Figure 1A:
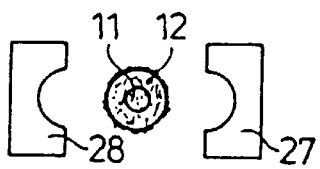
FIG. 1A is a section view taken along line 1A—1A of the stripping rings of FIG. 1.
Figure 1B:
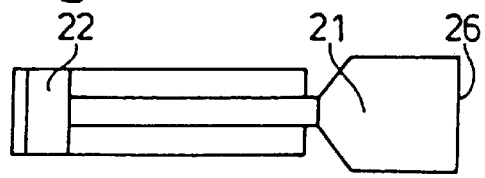
FIG. 1B is a sectional view taken along line 1B—1B of the stripping plunger of FIG. 1.

FIG. 1B is a view taken along line 3B—3B of the stripping plunger. The mortar 23 and the guide for the stripping plunger 21 are mounted in a common frame, which is not illustrated. In addition, as shown in FIG. 1A, two half rings 27 and 28 can be provided for removing residues which adhere to the sides of the outlet pipe 12. These half rings can be closed via a suitable mechanism, which is not illustrated, so that they surround the outlet pipe.

Figure 2:
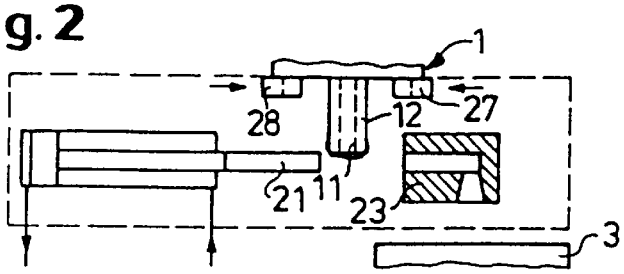
FIGS. 2–2C show various phases of the cleaning operation.
Figure 2A:
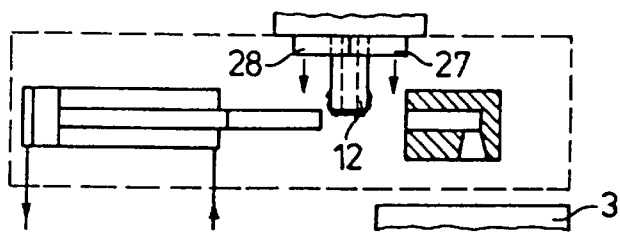
Figure 2B:
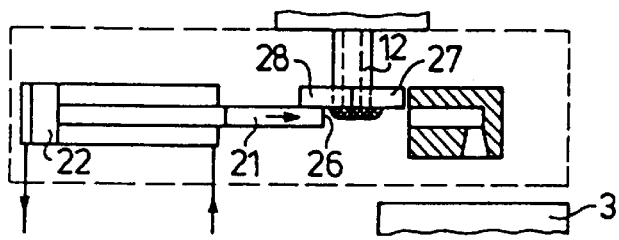
Figure 2C:
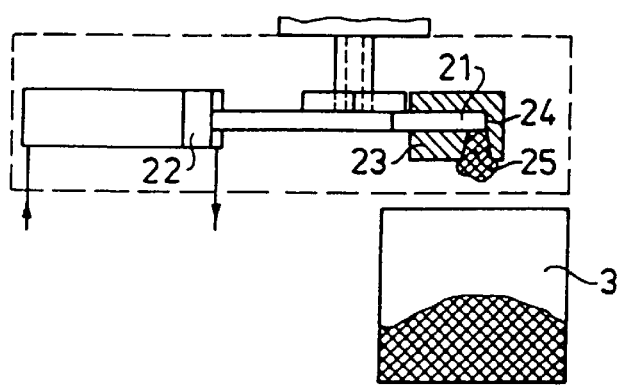

FIGS. 2—2C show various phases of the cleaning operation.

As shown in FIG. 2, with the cleaning device being stationary, the mixer head 1, after the completion of the injection operation, is first brought into a position in which the outlet pipe 12 is situated between the stripping half rings 27 and 28. As shown in FIG. 2A, the stripping half rings 27 and 28 are then closed so that they surround the outlet pipe 12. Thereafter, as shown in FIG. 2B, the residues adhering to the sides are conveyed into the plane of the outlet opening by an axial displacement of stripping rings 27, 28. As shown in FIG. 2C, by operating the hydraulic piston 22, the stripping edge 26 of the stripping plunger 21 is subsequently moved along the underside of the cleaning piston, outlet pipe and stripping ring, whereupon the residues are entrained and are conveyed into the mortar 23, where they are comminuted at the impact face 24 and ejected through the opening 25.

FIG. 3 shows the cleaning device according to the present invention for a slit-shaped outlet pipe 12, with a correspondingly shaped cleaning piston 11. As shown in FIG. 3A, the cleaning plunger 21 is matched to the contour of the outlet pipe 12. The opening of the mortar 23 is shaped correspondingly.

FIG. 3C constitutes the view taken along line 3C—3C from FIG. 3B, i.e. the end face of the cleaning plunger 21. Identical reference numerals denote comparable elements in the various Figures.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for removing plastics residue from a cleaning piston having an end face and a mixer head outlet pipe of a counter-current injection mixer head, wherein said device comprises a) a stripping plunger having a stripping edge;
   b) a mortar for receiving said stripping plunger, said mortar comprising an outlet opening for disposing said plastics residue from said mortar which is disposed at an angle to an impact face of said mortar;
   c) a hydraulic means for bringing said mixer head and said stripping plunger towards each other in a cleaning position, in which said stripping edge of said stripping plunger is aligned with said end face of said cleaning piston, wherein the axis of said cleaning piston is situated between said mortar and said stripping plunger; and
   d) a hydraulic means for moving said stripping plunger parallel to said end face of said cleaning piston into said mortar and towards said impact face of said mortar.

2. A device according to claim 1, wherein said end face of said cleaning piston is aligned with an outlet of said outlet pipe in said cleaning position.

3. A device according to claim 2, wherein a divisible stripping ring is provided for the peripheral surface of said outlet pipe wherein said stripping ring can be closed in the cleaning position and can be moved in the axial direction of said outlet pipe into a position in which said stripping ring is aligned with said stripping edge of said stripping plunger.

4. A device according to claim 3, wherein said stripping plunger exerts a force of 10 to 500 N/mm$^2$ on said impact face of said mortar.

5. A device according to claim 3, wherein a catchment vessel for receiving said plastics residue is disposed underneath said outlet opening of said mortar.

6. A device according to claim 2, wherein said stripping plunger exerts a force of 10 to 500 N/mm$^2$ on said impact face of said mortar.

7. A device according to claim 2, wherein a catchment vessel for receiving said plastics residue is disposed underneath said outlet opening of said mortar.

8. A device according to claim 1, wherein said stripping plunger exerts a force of 10 to 500 N/mm$^2$ on said impact face of said mortar.

9. A device according to claim 8, wherein a catchment vessel for receiving said plastics residue is disposed underneath said outlet opening of said mortar.

10. A device according to claim 1, wherein a catchment vessel for receiving said plastics residue is disposed underneath said outlet opening of said mortar.

11. A device according to claim 1, wherein said plastics residue is a polyurethane residue.

12. A device according to claim 11, wherein a catchment vessel for receiving said polyurethane residue is disposed underneath said outlet opening of said mortar.

* * * * *